US008166337B2

(12) United States Patent
Nakagawa

(10) Patent No.: US 8,166,337 B2
(45) Date of Patent: Apr. 24, 2012

(54) FAILURE ANALYSIS APPARATUS

(75) Inventor: Masato Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 12/230,241

(22) Filed: Aug. 26, 2008

(65) Prior Publication Data
US 2009/0006896 A1    Jan. 1, 2009

Related U.S. Application Data

(63) Continuation of application No. PCT/JP2006/303553, filed on Feb. 27, 2006.

(51) Int. Cl.
*G06F 11/00* (2006.01)
(52) U.S. Cl. ............... 714/5.1; 710/4; 710/12; 710/300; 710/301; 710/302; 710/303; 710/304; 714/25; 714/712; 702/117; 702/121; 700/97; 700/109; 700/110
(58) Field of Classification Search ............... 710/4, 12, 710/300–304; 714/25, 712; 700/97, 109, 700/110; 702/117, 121
See application file for complete search history.

(56) References Cited

U.S. PATENT DOCUMENTS

| | | | | |
|---|---|---|---|---|
| 6,185,630 B1* | 2/2001 | Simmons | | 710/10 |
| 6,202,103 B1* | 3/2001 | Vonbank et al. | | 710/15 |
| 6,363,452 B1* | 3/2002 | Lach | | 710/316 |
| 6,516,366 B1* | 2/2003 | Gates et al. | | 710/105 |
| 6,532,558 B1* | 3/2003 | Allen et al. | | 714/724 |
| 6,754,817 B2* | 6/2004 | Khatri et al. | | 713/1 |
| 6,959,257 B1* | 10/2005 | Larky et al. | | 702/120 |
| 7,020,815 B2* | 3/2006 | Jeddeloh | | 714/718 |
| 2001/0041967 A1* | 11/2001 | Nakayama | | 702/117 |
| 2002/0121913 A1* | 9/2002 | Miller et al. | | 324/760 |
| 2004/0078698 A1* | 4/2004 | Co et al. | | 714/42 |
| 2005/0138471 A1* | 6/2005 | Okbay et al. | | 714/25 |
| 2006/0235650 A1* | 10/2006 | Vinberg et al. | | 702/182 |
| 2007/0067687 A1* | 3/2007 | Ong | | 714/731 |

FOREIGN PATENT DOCUMENTS
JP    2001-331350    11/2001
(Continued)

OTHER PUBLICATIONS

International Search Report mailed May 23, 2006 in connection with the International Application No. PCT/JP2006/303553.
International Preliminary Report on Patentability mailed on Oct. 9, 2008 and issued in corresponding International Patent Application No. PCT/JP2006/303553.

(Continued)

*Primary Examiner* — Robert Beausoliel, Jr.
*Assistant Examiner* — Jeison C Arcos
(74) *Attorney, Agent, or Firm* — Staas & Halsey LLP

(57) ABSTRACT

Relating with board numbers of the boards mounted with the logic circuits and mounted places on the boards and in relation to log information to be collected from the logic circuits, analysis information describing information to be processed when the log information is generated, information of a condition for which the log information is to be valid, and information of a condition for which the log information is to be invalid are defined for analyzing failures using the analysis information based on the logic circuits. Upon the realization of the failure analysis based on the logic circuits, the analysis information further describes information of the priority of the log information to realize a thorough analysis of critical failures.

11 Claims, 17 Drawing Sheets

FOREIGN PATENT DOCUMENTS

| | | |
|---|---|---|
| JP | 2003-162430 | 6/2003 |
| JP | 2005-004326 | 1/2005 |
| JP | 2005-4326 | 1/2005 |
| JP | 2005-284357 | 10/2005 |

OTHER PUBLICATIONS

Japanese Office Action mailed Oct. 6, 2009 and issued in corresponding Japanese Patent Application 2008-502565.

* cited by examiner

FIG. 3

```
# Sample of RAS-DB definition        COMMENT
#FILE VER=V01L01  DATE=2005/07/13    FILE VERSION NUMBER    } DECLARATION
                                     FILE UPDATE DATE         UNIT 60
#include "(FILE NAME)"               INSERT EXTERNAL FILE

#RASDB  TYPE=(DEFINITION TYPE)  VER=(FORMAT VERSION NUMBER)
                                     START DEFINING (COMMON DEFINITION BLOCK) ~63     COMMON INFORMATION     } DEFINITION
                                     OF DATA DEFINITION       UNIT 61
   (DATA DEFINITION BLOCK) ~62
                                     DATA DEFINITION

#END                                 END DEFINING
```

FIG. 4

```
#ASIC      TYPE=(ASIC TYPE)     VER=(ASIC VERSION NUMBER)
#MODEL     TYPE=(MODEL TYPE)
#BORAD     NUM=(BOARD DESIGNATION)
#PLACE     NUM=(ASIC DESIGNATION)
#FUNCTION  TYPE=(FUNCTION MODE)
#IR        NUM=(IR CODE)
#DIRECTION        TYPE=(DIRECTION OF INTERFACE BETWEEN ASICS)
#QUIET     NUM=(QUIET CODE)
#LEVEL     TYPE=(ERROR EVENT LEVEL)
#CONVERT   NUM=(CONVERSION RULE NUMBER)
#MARK      NAME=(FAILURE MARK)
```

FIG. 5

```
#lsi,ver,mdl,func,
#      bd ,pl,ir,adrs,linename,         ,rcrt,pr,scr,dis,enb,quiet,lvl ,msg,action                              ,conv,mark
SC,,DC2,,0001, F,58,0123,/XC/RC_MEM_ECC_CE,RC,RC,40,FFFF,    ,  ,1 ,WARN,15 ,SC_LOGO_INTF, 0                    ,./CMU#0:
SC,,DC2,,0001, F,58,0124,/XC/RC_BUS_ECC_CE,RC,RC,40,FFFF,    ,  ,1 ,WARN,15 ,SC_LOGO_INTF, 0                    ,./CMU#0:
SC,,DC2,,0001, F,58,0125,/XC/RC_BUS_LRU_ER,RC,RC,20,FFFF,    ,  ,1 ,WARN,15 ,SC_LOGO_INTF, 0                    ,./CMU#0:
SC,,DC2,,0001, F,58,0128,/XC/RT_BUS_LRU_ST,RT,RT,40,FFFF,    ,  ,1 ,WARN,15 ,SC_LOGO_INTF, 0                    ,./CMU#0:
SC,,DC2,,0001, F,59,0342,/XC/RC_MEM_ECC_CE,RC,RC,10,FFFF,    ,  ,1 ,ALRM,2F ,SC_FTL1_INTF, 0                    ,./CMU#0:
SC,,DC2,,0001, F,59,0353,/XC/RC_MEM_ECC_CE,RC,RC,10,FFFF,    ,  ,1 ,ALRM,2A ,SC_FTL1_INTF, 0                    ,./CMU#0:
SC,,DC2,,0001, F,59,0373,/XC/RC_MEM_LOCK_CE,RC,10,FFFF, /XC/RC_COPY_LOCK_CE, /XC/RC_RETRY_LOCK_CE
                                                     ,  ,1 ,ALRM,2A ,SC_FTL1_INTF, 0                    ,./CMU#0:
```

FIG. 7

```
# ./cpu/cpu.rcrt            ......   COMMENT
#FILE VER=V01L01  DATE=2005/07/13  ......   FILE VERSION NUMBER
#RASDB  TYPE=RCRT   VER=0001       ......   START DEFINING
# COMMON DEFINITION BLOCK
#ASIC   TYPE=CPU    VER=B1
#BORAD  NUM=FFFF
#PLACE  NUM=F
########################################
# DC MODEL DEFINITION
#MODEL  TYPE=DC1|DC2|DC3
#lsi,ver,mdl,fnc,bd ,pl,
#    ir,adrs,linenm, ,rcrt,pr,scr  ,dis,enb,quiet,lvl ,msg,action    ,conv,mark
.....1,58,0010,/A0/RC_OUT,RC,40,FFFF,  ,  ,  ,1,WARN,15 ,CPU_INTF_0,0  ,/CMU#0/CPUM#0@CPU#0/IFSC#0:
.....2,58,0010,/A0/RC_OUT,RC,40,FFFF,  ,  ,  ,1,WARN,15 ,CPU_INTF_0,0  ,/CMU#0/CPUM#1@CPU#0/IFSC#0:
.....4,58,0010,/A0/RC_OUT,RC,40,FFFF,  ,  ,  ,1,WARN,15 ,CPU_INTF_0,0  ,/CMU#0/CPUM#2@CPU#0/IFSC#0:
.....8,58,0010,/A0/RC_OUT,RC,40,FFFF,  ,  ,  ,1,WARN,15 ,CPU_INTF_0,0  ,/CMU#0/CPUM#3@CPU#0/IFSC#0:
########################################
# FF MODEL DEFINITION
#MODEL  TYPE=FF1|FF2
#lsi,ver,mdl,fnc,bd ,pl,
#    ir,adrs,linenm, ,rcrt,pr,scr  ,dis,enb,quiet,lvl ,msg,action    ,conv,mark
.....1,58,0010,/A0/RC_OUT,RC,40,FFFF,  ,  ,  ,1,WARN,20 ,CPU_INTF_0,0  ,/CMU#0/CPUM#0@CPU#0/IFSC#0:
.....2,58,0010,/A0/RC_OUT,RC,40,FFFF,  ,  ,  ,1,WARN,21 ,CPU_INTF_0,0  ,/CMU#0/CPUM#1@CPU#0/IFSC#0:
.....4,58,0010,/A0/RC_OUT,RC,40,FFFF,  ,  ,  ,1,WARN,22 ,CPU_INTF_0,0  ,/CMU#0/CPUM#2@CPU#0/IFSC#0:
.....8,58,0010,/A0/RC_OUT,RC,40,FFFF,  ,  ,  ,1,WARN,23 ,CPU_INTF_0,0  ,/CMU#0/CPUM#3@CPU#0/IFSC#0:
#END
```

FIG. 8

```
# ./sc/sc.rcrt          ................ COMMENT
#FILE VER=V01L01 DATE=2005/07/13  ................ FILE VERSION NUMBER
#RASDB TYPE=RCRT VER=0001         ................ START DEFINING
# COMMON DEFINITION BLOCK
#ASIC   TYPE=SC    VER=B1
#MODEL  TYPE=ALL
#BORAD  NUM=FFFF
#PLACE  NUM=F
# DATA DEFINITION BLOCK     :
#lsi, ver, mdl, fnc, bd , pl,
#    ir, adrs, linename,  , rcrt, pr, scr, dis,           enb,quiet,lvl ,msg,action ,conv,mark
    ...... ,10, 0123, /X0/RC_RSV, RC, 40, FFFF , /CMU#0/CPU#0/AO/RC_OUT,, 1    , WARN, 15 , SC_INTF_0,0 , /CMU#0@SC#0/IFCPU#0 :
    ...... ,11, 0123, /X0/RC_RSV, RC, 40, FFFF , /CMU#0/CPU#1/AO/RC_OUT,, 2    , WARN, 15 , SC_INTF_0,0 , /CMU#0@SC#0/IFCPU#1 :
    ...... ,12, 0123, /X0/RC_RSV, RC, 40, FFFF , /CMU#0/CPU#2/AO/RC_OUT,, 3    , WARN, 15 , SC_INTF_0,0 , /CMU#0@SC#0/IFCPU#2 :
    ...... ,13, 0123, /X0/RC_RSV, RC, 40, FFFF , /CMU#0/CPU#3/AO/RC_OUT,, 4    , WARN, 15 , SC_INTF_0,0 , /CMU#0@SC#0/IFCPU#3 :
    ...... ,20, 0200, /A/RC_XX,   RC, 20, FFFF ,                       ,, 10   , WARN, 12 , SC_ITNL_1,0 , /CMU#0@SC#0 :
    ...... ,20, 0300, /B/RC_XX,   RC, 20, FFFF ,                       ,, 10   , WARN, 12 , SC_ITNL_1,0 , /CMU#0@SC#0 :
    ...... ,50, 0044, /A/RC_YY,   RC, 10, FFFF ,                       ,, 20   , ALRM, 11 , SC_ITNL_0,0 , /CMU#0@SC#0 :
    ...... ,50, 0144, /B/RC_YY,   RC, 10, FFFF ,                       ,, 20   , ALRM, 11 , SC_ITNL_0,0 , /CMU#0@SC#0 :
#END
```

FIG. 13
AT SYSTEM STARTUP
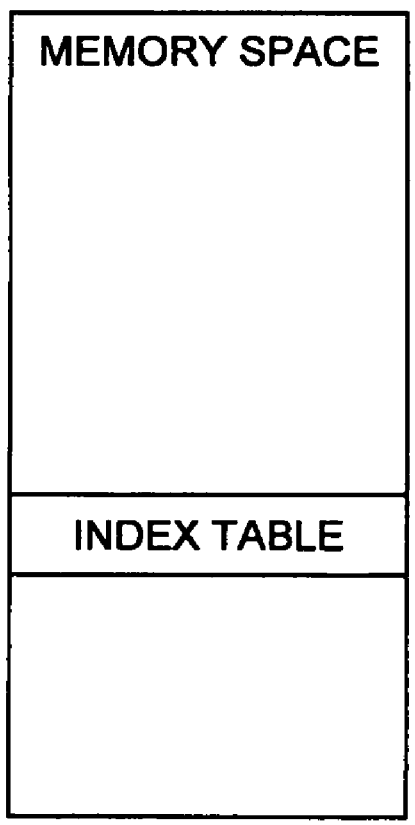
DURING ANALYSIS
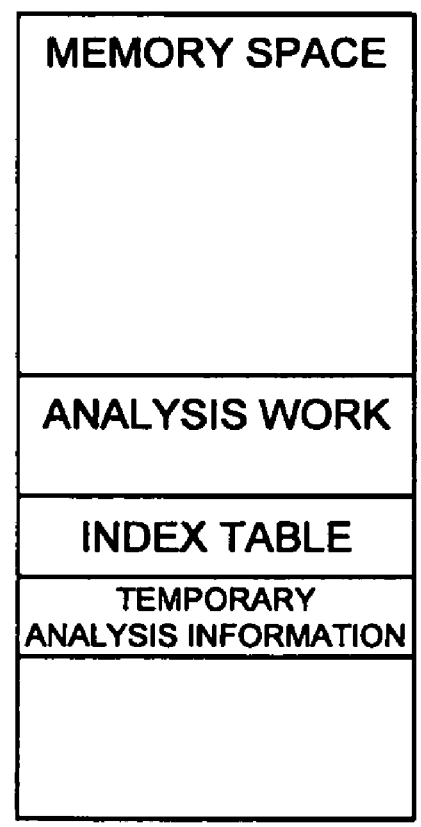

FIG. 17
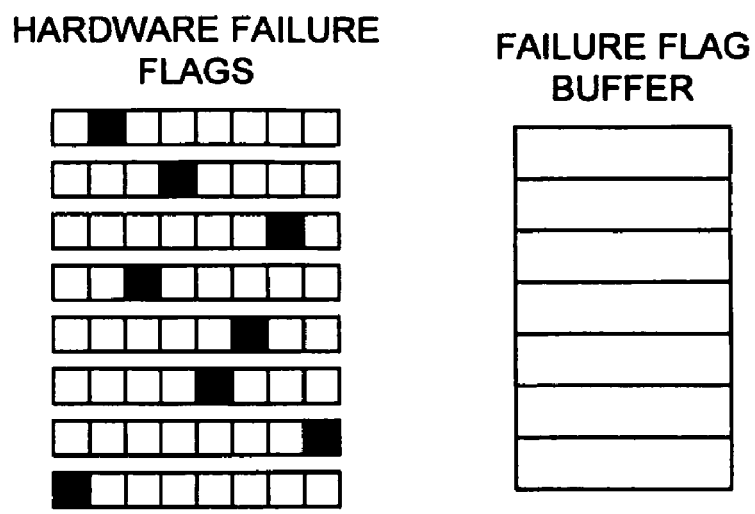
FIG. 18
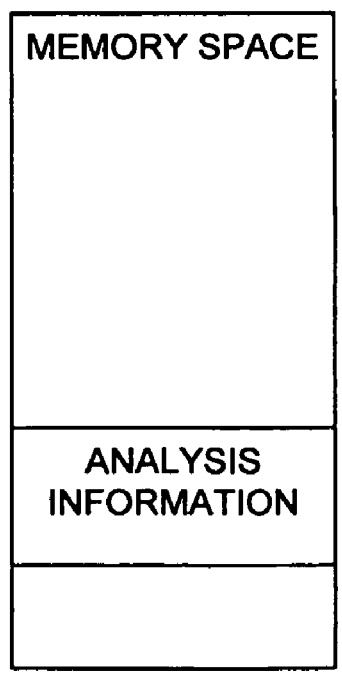
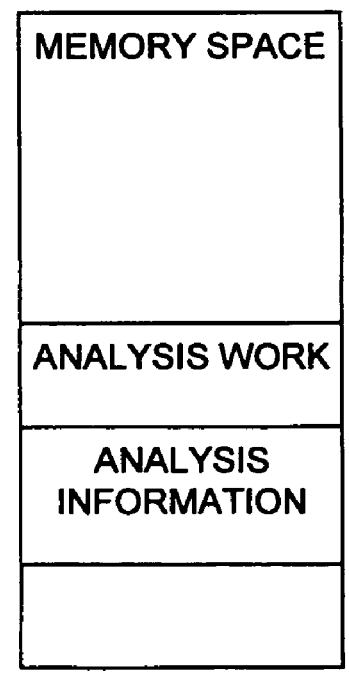

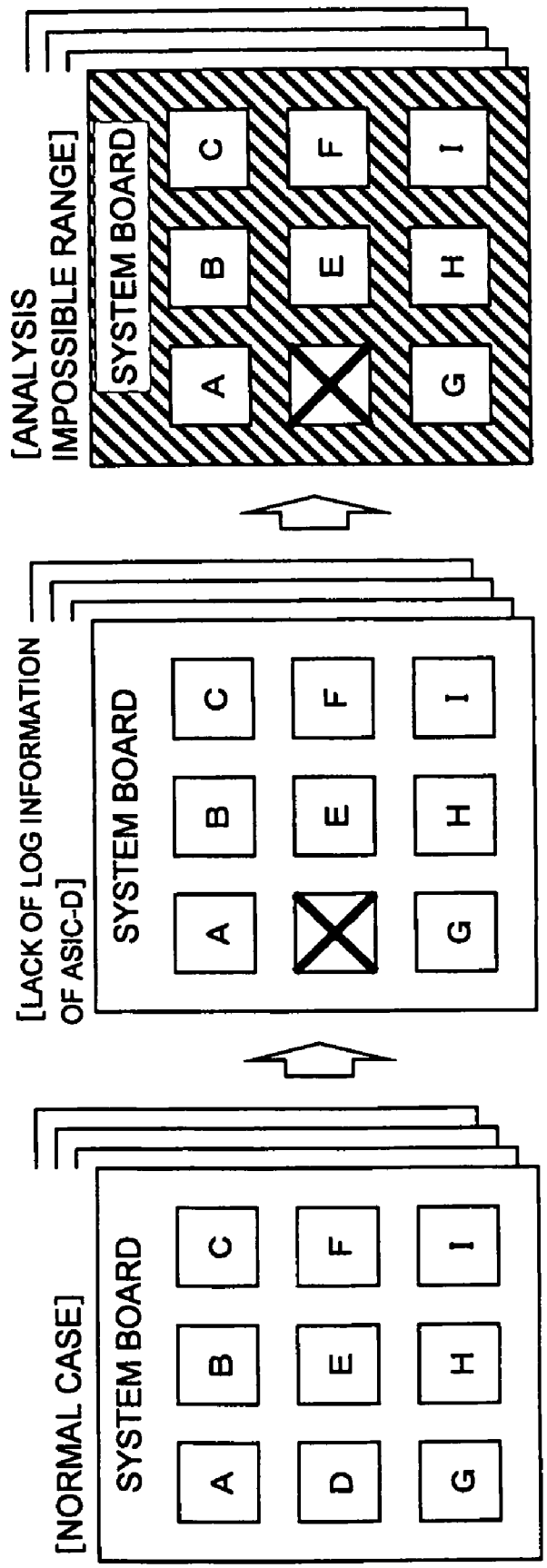

FAILURE ANALYSIS APPARATUS

CROSS REFERENCE TO RELATED APPLICATIONS

This is a continuation application of PCT application serial number PCT/JP2006/303553, filed on Feb. 27, 2006.

BACKGROUND OF THE INVENTION

1. Field of the Invention

An embodiment of the present invention relates to a failure analysis apparatus, which may include a failure analysis apparatus that is implemented in an information processing apparatus having a plurality of boards mounted with a plurality of logic circuits and that analyzes what kind of failure has occurred in the logic circuits to realize a reduction in memory resources, faster processing, and a reduction in labor for development, and to realize a thorough analysis of critical failures, and to realize a reduction in the unanalyzable range.

2. Description of the Related Art

Today, an information processing apparatus is mounted with high-density, integrated, and complicated LSIs such as ASICs (Application Specific Integrated Circuit). In order to reduce a down time or a recovery time in the above apparatus, it is strongly demanded that a failure analysis function is realized to autonomously and quickly determine an accurate location of the failure, when the failure occurs in the LSIs, and to autonomously and quickly determine the affected range.

The progress in the integration of LSIs has led to a continuous increase in analysis information required for the failure analysis of LSIs. This requires an input operation of a large amount of analysis information. Further, communication is inevitable between a designer of the LSIs, a designer of the system mounted with the LSIs, and a designer of the firmware for analyzing failure of the LSIs. Therefore, an enormous amount of labor for the development is required to realize such a failure analysis function.

Thus, it is strongly desired to establish a new technique to efficiently realize such a failure analysis function.

An information processing apparatus mounted with ASICs usually includes a plurality of system boards mounted with a plurality of types of a plurality of ASICs.

For this reason, conventionally, when a failure occurs in ASICs, failure is analyzed for each of system boards using one or a plurality of analysis tables are prepared. And, an analysis results performed on every system boards are collected to deliver the analysis result of the entire system.

FIG. 15 illustrates a configuration of a conventional art.

In FIG. 15, reference numeral 100 denotes a plurality of system boards to be analyzed that are implemented in the information processing apparatus. Reference numeral 110 denotes a board analysis information table. Reference numeral 120 denotes a system analysis information table. Reference numeral 130 denotes an analysis processing unit.

The system boards 100 are usually mounted with a plurality of types of a plurality of ASICs. The board analysis information table 110 is defined for each system board 100, and stores information necessary for analyzing failures occurred in the ASICs mounted on the system boards 100. The system analysis information table 120 stores information necessary for analyzing failures between the system boards 100. The analysis processing unit 130 is provided with an analysis process function for analyzing failures of each system board 100 and an analysis process function for analyzing failures of the entire system.

Specifically, the analysis processing unit 130 is realized by firmware (hereinafter, may be referred to as monitoring firmware) implemented in the information processing apparatus. The board analysis information table 110 and the system analysis information table 120 are deployed on memories provided with the firmware.

In a conventional art configured this way, log information of the ASICs (hardware failure flags described below) is collected on every system boards 100. The board analysis information table 110 are defined for each of the system board 100, and are used to analyze a failure related to the system boards 100, thereby specifying the failure occurred in the system board 100.

After the failure analysis related to the system boards 100 is finished, the system analysis information table 120 is used. For example, in consideration of the fact that a failure detected in a receiver end has occurred in relation to a failure occurred in a transmitting end, the failure detected in the receiver end is excluded from the failure analysis. And, the failure analysis of the entire system is performed, thereby ultimately specifying what kind of failure has occurred.

In this way, in the conventional art, when a failure occurs in ASICs, the failure is first analyzed on every system boards 100, and then the analysis results on every system boards 100 are collected to deliver the analysis result of the entire system.

The designer of the ASICs or the designer of the system boards 100 creates the board analysis information table 110 required for performing the above failure analysis. And, the designer of the system or the designer of the system boards 100 creates the system analysis information table 120.

More specifically, in the conventional art, as shown in FIG. 16, the designer of the ASICs independently in collaboration with the designer of the system boards 100 creates a board analysis definition, which is data of the board analysis information table 110 before compiling, for each type of ASIC. The system designer, who manages the system independently or in collaboration with the designer of the system boards 100, edits the board analysis definition to create a system analysis definition, which is data before the compilation of the system analysis information table 120. The board analysis definition and the system analysis definition thus created are compiled into forms which can be imported to the monitoring firmware, thereby creating the board analysis information table 110 and the system analysis information table 120.

The analysis processing unit 130 uses the board analysis information table 110 thus created to analyze failures related to the system boards 100. In this case, as shown in FIG. 17, the analysis processing unit 130 stores hardware failure flags (flag group in hardware for showing the cause of failure in case of hardware failure) collected from the ASICs in a failure flag buffer reserved for failure analysis, and then executes a process of specifying what kind of failure has occurred.

When executing the process, the conventional analysis processing unit 130 stores hardware failure flags detected before the failure flag buffer is full into the failure flag buffer, and, when the failure flag buffer is full, the analysis processing unit 130 abandons hardware failure flags detected after the full of the buffer. And, the analysis processing unit 130 extracts what kind of hardware failure flags are stored in the failure flag buffer, thereby specifying what kind of failure has occurred.

Thus, when a large amount of hardware failure flags are set, the conventional analysis processing unit 130 discontinues the failure analysis after a certain number of detections, and reports the failure analysis result up to that point.

The analysis processing unit 130 analyzes failures using the board analysis information table 110 and the system analysis information table 120 created with a method as shown in FIG. 16. However, in the conventional analysis processing unit 130, as shown in FIG. 18, the board analysis information table 110 and the system analysis information table 120 that are information used in the failure analysis are permanently stationed in a memory of the monitoring firmware immediately after the startup of the system, although the failure analysis is a temporary process executed when an abnormality occurs in the system.

A memory space in FIG. 18 shows a system memory space of the monitoring firmware. Analysis information in FIG. 18 shows the board analysis information table 110 and the system analysis information table 120, both of which are information used in the failure analysis. An analysis work in FIG. 18 shows a work memory area used by the monitoring firmware in the failure analysis.

As described, when a failure occurs in the ASIC, in the conventional art, the failure on every system boards 100 is firstly analyzed, and then the analysis results on every system boards 100 is collected, thereby delivering the analysis result of the entire system.

In this way, in the conventional art, the failure analysis is performed on every system boards 100. Therefore, as shown in FIG. 19, for example, when hardware failure flags of one ASIC (for example, ASIC-D in FIG. 19) mounted on the system boards 100 cannot be collected, the entire failure analysis of the system boards 100 becomes impossible.

There are following problems according to such a conventional art.

(1) Problems in Relation to Memory Resources and Processing Time

According to the conventional failure analysis method based on every system boards 100, when analyzing failures, all hardware failure flags of the system boards 100 must be written into a work memory area (analysis work shown in FIG. 18) used for the failure analysis.

However, since several to several tens of ASICs are mounted on the system boards 100, the number of hardware failure flags in the entire system boards 100 is significantly large.

Therefore, there is a problem that a large amount of memory is required for the failure analysis according to the conventional failure analysis method based on every system boards 100.

Furthermore, the same type of ASICs is mounted on the system boards 100. And, according to the conventional failure analysis method in which the analysis is performed on every system boards 100, the board analysis information tables 110 are generated on every system boards 100. Thus, board analysis information tables 110 of same ASICs are duplicately generated. This also leads to a demand for a large amount of memory resources.

More specifically, even in the same ASICs, the board analysis information tables 110 differ according to the mounted places of each ASICs. However, in the conventional failure analysis method based on every system boards 100, a structure is not employed in which the analysis definitions according to the mounted places of each ASICs are described in the board analysis information tables 110. Thus, the board analysis information tables 110 cannot be shared. Therefore, a large amount of memory resources has been demanded, since the board analysis information tables 110 of the same ASICs are duplicately included.

Moreover, the failure analysis is a temporary process executed when a failure occurs in the system. However, according to the conventional failure analysis method based on every system boards 100, the board analysis information tables 110 and the system analysis information tables 120, which are information used in the failure analysis, are permanently stationed in a memory of the monitoring firmware immediately after the startup of the system, as described in FIG. 18.

When the type or the version number of the ASICs mounted on the information processing apparatus is known in advance, only the corresponding number of the board analysis information tables 110 and the system analysis information tables 120 are permanently stationed. However, when the type or the version number of the ASICs is not known in advance, all tables for the ASICs which will be mounted on the information processing apparatus need to be permanently stationed, and a large amount of memory is required for the permanently station.

In this regard too, there is a problem that a large amount of memory resources are required according to the conventional failure analysis method based on every system boards 100.

Secondary, several thousands to several tens of thousands of hardware failure flags are needed for each ASIC. Then, the several hundreds of thousands of hardware failure flags are analyzed in the system boards 100 as a whole. Further, the board analysis information tables 110 are prepared on every system boards 100. Thus, a vast amount of calculations are required for searching the board analysis information tables 110.

For this reason, according to the conventional failure analysis method based on every system boards 100, there is a problem that an enormous amount of processing time is required for the failure analysis.

(2) About Labor for Development

In the conventional failure analysis method based on every system boards 100, two kinds of tables, the board analysis information table 110 and the system analysis information table 120, are used for analyzing failures. As described in FIG. 16, the designer of the ASICs or the designer of the system boards 100 creates the board analysis information table 110, and the designer of the system or the designer of the system boards 100 creates the system analysis information table 120.

Therefore, according to the conventional failure analysis method based on every system boards 100, labor for the development are generated during the initial design or the modification designs of the tables 110 and 120, and there is a problem that burdens are imposed on the designers.

Moreover, it is inevitable that the designer recognize the description definition of the analysis information in different ways. Therefore, according to the conventional failure analysis method based on every system boards 100, there is a problem that an error occurs due to the difference in recognition.

(3) About Missed Analysis

As described in FIG. 17, the conventional failure analysis method discontinues the failure analysis after a certain number of detections, since the failure flag buffer cannot store the hardware failure flags when a large amount of the hardware failure flags are set.

Therefore, according to the conventional failure analysis method, there is a problem that more critical failures are missed which are detected after the failure flag buffer has become full.

(4) About Unanalyzable Range

In the conventional failure analysis method based on every system boards 100, as described in FIG. 19, there is a problem that the entire failure analysis of the system boards 100 becomes impossible in a situation such as when the hardware failure flags cannot be collected from even one ASIC mounted on the system boards 100 due to some kind of a secondary problem.

SUMMARY OF THE INVENTION

The present invention has been made in view of the foregoing circumstances, and for realizing a function of analyzing failures occurred to logic circuits such as LSI mounted on an information processing apparatus, one aspect of an object of the present invention is to provide a new failure analysis technique that realizes a reduction in memory resources, faster processing, and a reduction in labor for the development and that realizes a thorough analysis of critical failures, and further realizing a reduction in an unanalyzable range.

In order to achieve the object, a failure analysis apparatus of an embodiment of the present invention is implemented on an information processing apparatus having a plurality of boards each of which are mounted with a plurality of logic circuits, and analyzes what kind of failure has occurred in the plurality of logic circuits. The failure analysis apparatus includes: storage means for storing analysis information for log information to be collected from the plurality of logic circuits, the analysis information being related with board numbers of the boards mounted with the logic circuits and mounted places on the boards, the analysis information describing information to be processed when the log information is generated, information of a condition for which the log information is to be valid, and information of a condition for which the log information is to be invalid; collecting means for collecting, when a failure occurs in the plurality of logic circuits, the log information indicating an occurrence of the failure from the plurality of logic circuits; and analysis means for analyzing what kind of failure has occurred in the plurality of logic circuits based on the log information collected by the collection means and the analysis information stored in the storage means.

In addition, the failure analysis apparatus may further includes: first deployment means for storing index information in the storage means when the failure analysis apparatus is started up, the index information being used for an index of the analysis information applied to logic circuits that may be mounted on the information processing apparatus to be analyzed; and second deployment means for specifying, when a failure occurs in the logic circuits, the analysis information necessary for the analysis by the analysis means according to the index information and the information of the logic circuits mounted on the information processing apparatus to be analyzed, and storing the specified analysis information in the storage means.

In addition, the storage means may describe information of a condition denoting which log information indicates an occurrence of a failure as the information of a condition for which the log information is to be valid, and may describe information of a condition denoting which log information indicates an occurrence of a failure as the information of a condition for which the log information is to be invalid.

The failure analysis apparatus of an embodiment of the present invention having such features stores only the index information used for the index of the analysis information in the storage means, when the failure analysis apparatus is started up.

The information processing apparatus then starts processing, and therefore, when a failure occurs to a certain logic circuit during the execution of the process, the failure analysis apparatus collects log information indicating the occurrence of the failure from each logic circuit.

The failure analysis apparatus acquires information indicating what kind of logic circuits are used in the information processing apparatus along with the collection of the log information, specifies the analysis information applied to the logic circuits indicated by the acquired information according to the index information stored in the storage means, and stores the specified analysis information in the storage means.

Subsequently, the failure analysis apparatus refers to the analysis information stored in the storage means to extract valid information based on condition information described in the analysis information from the collected log information indicating the occurrence of the failure to thereby analyze what kind of failure has occurred in the logic circuits.

The failure analysis apparatus extracts log information having higher priority based on priority information described in the analysis information to prevent missed analysis of critical failures.

This extraction process can be performed as follow, after extracting the valid log information based on the condition information described in the analysis information from the log information collected by the collection means. That is, when the priority of the extracted log information is higher than the priority of the log information stored in a buffer having a prescribed memory capacity, the extracted log information is stored by switching with log information having the lowest priority stored in the buffer, and, when the priority of the extracted log information is lower than the priority of the log information stored in the buffer, the extracted log information in the buffer is not stored.

In this way, in the failure analysis apparatus of an embodiment of the present invention, relating with the board numbers of the boards mounted with the logic circuits and the mounted places on the boards and in relation to the log information collected from the logic circuits, the analysis information describing the information to be processed when the log information is generated, the information of the condition for which the log information is to be valid, and the information of the condition for which the log information is to be invalid is defined to thereby employ a configuration in which the failure analysis is performed using the analysis information based on the logic circuits, the failure analysis of which has been performed on every system boards in the conventional art.

The analysis information further describes information of the priority of the log information to thereby perform a thorough analysis of the critical failures for realizing the failure analysis based on the logic circuits.

According to the embodiment of the present invention, following advantages can be realized.

(1) Advantages in Relation to Memory Resources and Processing Time

The embodiment of the present invention uses a failure analysis method based on the logic circuits. Therefore, when writing log information, which indicates the occurrence of failure, in a work memory for analyzing the failure, significantly less amount of log information needs to be written in as compared to the conventional failure analysis method based on every system boards.

In this way, according to the embodiment of the present invention, the memory required for the failure analysis can be significantly reduced as compared to the conventional failure analysis method based on every system boards.

Furthermore, in the embodiment of the present invention, analysis information required for the failure analysis is defined relating with the board numbers of the boards mounted with the logic circuits and the mounted places on the boards, and the analysis information with such a description form is used to analyze failures. Therefore, when the same logic circuits are mounted on the system boards, the analysis information in relation to the logic circuits can be shared.

In this regard too, according to the embodiment of the present invention, the memory required for the failure analysis can be significantly reduced as compared to the conventional failure analysis method based on every system boards.

Moreover, in the embodiment of the present invention, the analysis information is not resident in the storage means for storing the analysis information, and only the analysis information necessary for the storage means is deployed when a failure occurs.

In this regard too, according to the embodiment of the present invention, the memory required for the failure analysis can be significantly reduced as compared to the conventional failure analysis method in which even the analysis information not to be used is resident in the storage means.

The embodiment of the present invention uses the failure analysis method based on the logic circuits. Therefore, significantly less amount of log information needs to be analyzed as compared to the conventional failure analysis method based on every system boards, and furthermore, only the analysis information limited to a single logic circuit needs to be searched.

Thus, according to the embodiment of the present invention, the processing time required for the failure analysis can be significantly reduced as compared to the conventional failure analysis method based on every system boards.

(2) About Labor for the Development

The embodiment of the present invention uses the failure analysis method based on the logic circuits and further uses the information describing prescribed contents as analysis information used for the failure analysis.

Therefore, the embodiment of the present invention enables to share the definition format of the analysis information inputted by the designer of the logic circuits. Thus, the input operation can be integrated, and the use of a tool for supporting the input operation enables to realize creation of the consistent analysis information by the designer of the logic circuits, thereby significantly reducing the labor for the development.

Furthermore, according to the embodiment of the present invention, the definition format enables to reduce the difference in recognition of the description definition of the analysis information between the designer so that the occurrence of an error due to the difference in recognition can be prevented.

(3) About Missed Analysis

In the embodiment of the present invention, log information that indicates the occurrence of failure is checked according to the order of priority defined in the analysis information to thereby analyze failures.

Therefore, according to the embodiment of the present invention, a disadvantage such as missing an occurrence of a more critical failure can be prevented.

(4) About Unanalyzable Range

The embodiment of the present invention uses the failure analysis method based on the logic circuits. Therefore, the impossible range of the failure analysis due to a lack of log information is based on the logic circuits.

Thus, according to the embodiment of the present invention, the impossible range of the failure analysis can be significantly reduced as compared to the conventional art.

In this way, when realizing the function of analyzing failures occurred in the logic circuits such as LSIs mounted on the information processing apparatus, the embodiment of the present invention enables to realize a reduction in memory resources, faster processing, and a reduction in the labor for the development and realize a thorough analysis of critical failures, and further realizing a reduction in the unanalyzable range.

BRIEF DESCRIPTION OF THE DRAWINGS

FIG. 3 is an explanatory view of a data structure of an RAS-DB file.

FIG. 4 depicts an example of information defined in a common definition block.

FIG. 5 depicts an example of analysis information defined in a data definition block.

FIG. 7 depicts an example of the analysis information.

FIG. 8 depicts an example of the analysis information.

FIG. 13 is an explanatory view of a process for executing the main body log analysis process.

FIG. 17 is an explanatory view of the conventional art.

FIG. 18 is an explanatory view of the conventional art.

FIG. 19 is an explanatory view of the conventional art.

DETAILED DESCRIPTION OF THE PREFERRED EMBODIMENTS

The embodiment of the present invention will now be described in detail according to the embodiments.

In the embodiment of the present invention, an information processing apparatus mounted with ASICs executes a process of delivering the analysis result of the entire system by analyzing a failure based on the ASICs when a failure occurs to the ASICs. As a result, it becomes possible to realize the elimination of the failure analysis of the entire system required in the conventional failure analysis that has been performed on every system boards.

Figure 1:
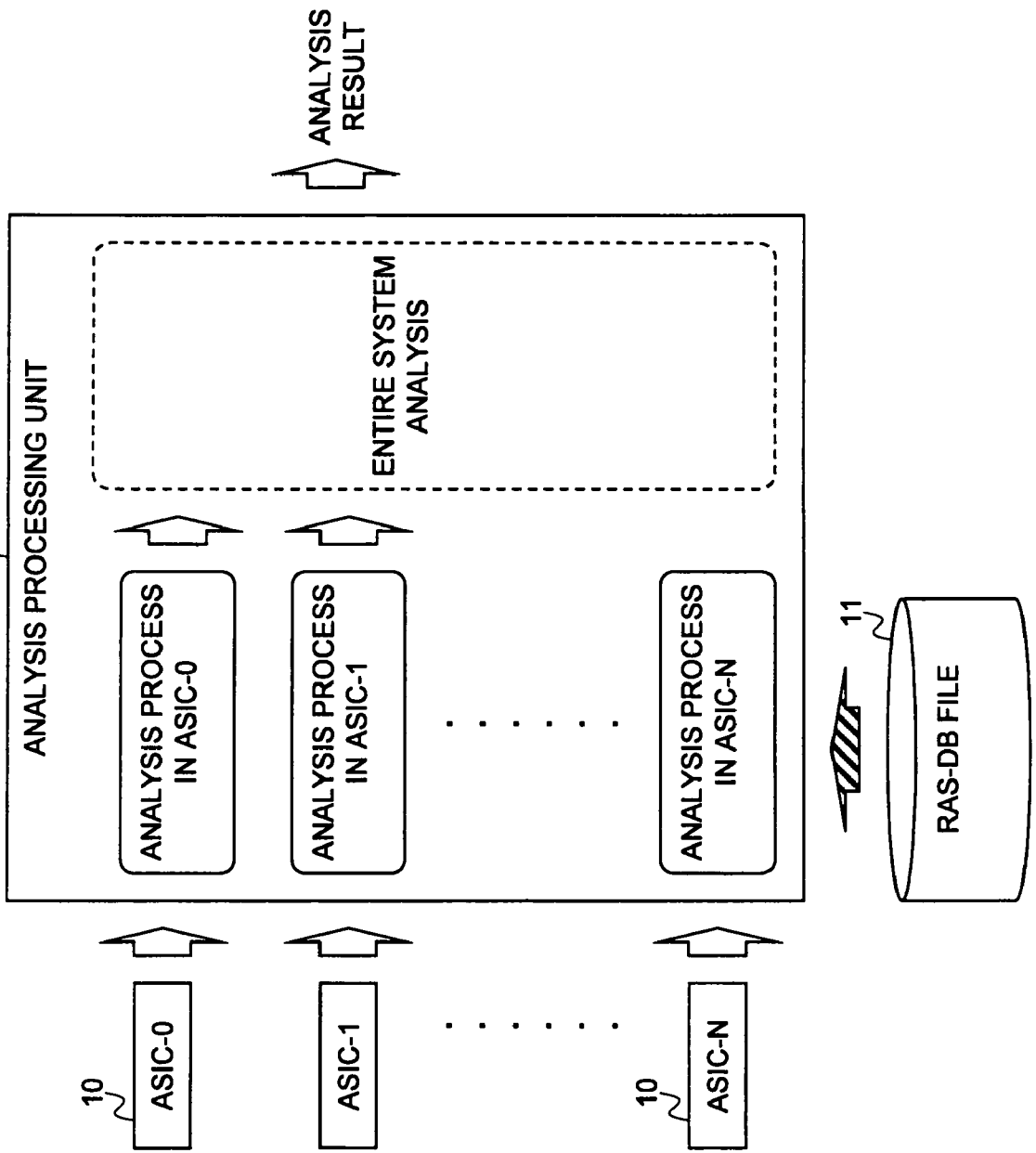
FIG. 1 is a configuration diagram of an embodiment of the present invention.

FIG. 1 illustrates a configuration of an embodiment of the present invention that executes the process.

In FIG. 1, reference numeral 10 denotes N ASICs to be analyzed that are mounted on the information processing apparatus, reference numeral 11 denotes an RAS-DB file, and reference numeral 12 denotes an analysis processing unit.

The RAS (Reliability Availability Serviceability)-DB file 11 is defined for each of the ASICs 10, stores analysis information necessary for the analysis of the failure occurred to the ASIC 10, and further stores analysis information necessary for the analysis of the failure of the entire system by adding to the analysis information.

The analysis processing unit 12 uses the analysis information stored in the RAS-DB file 11 to analyze failures occurred in the ASICs 10, and thus realizes the failure analysis of the entire system by the above failures analyzing.

In the embodiment of the present invention configured in such a way, when a failure occurs, log information is collected from N ASICs 10, and the analysis processing unit 12 processes to perform failure analysis to each piece of the collected log information.

The failure analysis performed at this point is not limited to the failure analysis of the ASICs 10, but also includes failure analysis of the entire system according to the analysis information stored in the RAS-DB file 11.

In this way, in the embodiment of the present invention, the analysis information stored in the RAS-DB file 11 is used to analyze the failures occurred in the ASICs 10, and the failure analysis of the entire system is simultaneously realized by the above failures analyzing.

The analysis processing unit 12 that performs the failure analysis, which is distinctive in the embodiment of the present invention, is specifically realized by firmware implemented in the information processing apparatus, and the RAS-DB file 11 is stored in a ROM included in the firmware.

Figure 2:
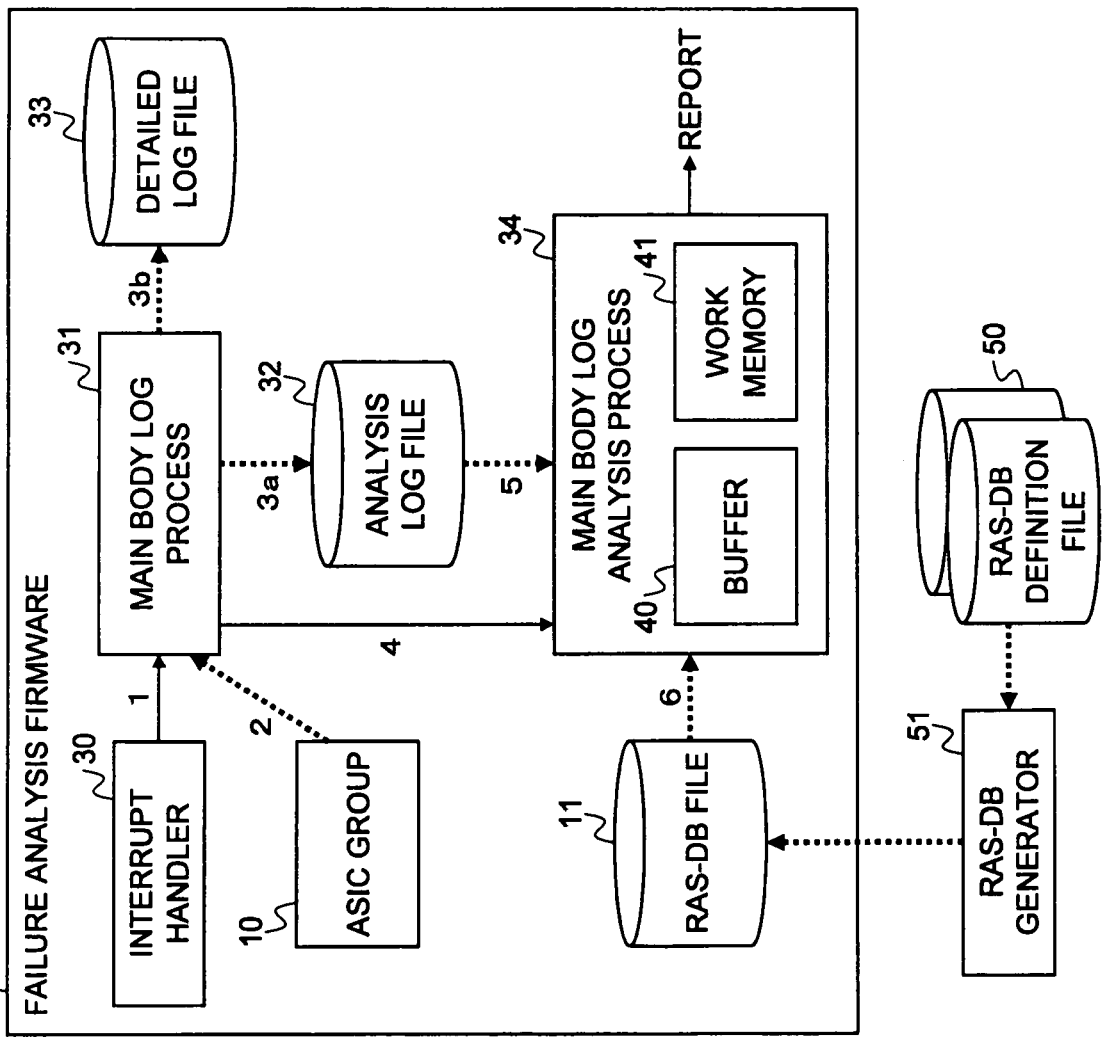
FIG. 2 depicts an example of a configuration of failure analysis firmware.

FIG. 2 illustrates an example of a configuration of failure analysis firmware 20 that controls the failure analysis process.

In FIG. 2, the same components as shown in FIG. 1 are designated with the same reference numerals. Solid lines shown in FIG. 2 denote a flow of the process, and dashed lines shown in FIG. 2 denote a flow of data.

As shown in FIG. 2, the failure analysis firmware 20 that controls the failure analysis process of an embodiment of the present invention comprises, in addition to the RAS-DB file 11 described in FIG. 1, an interrupt handler 30, a main body log process 31, an analysis log file 32, a detailed log file 33, and a main body log analysis process 34.

The interrupt handler 30 receives an interrupt from the ASICs 10 indicating that a failure has occurred. The main body log process 31 receives an interrupt reception notification from the interrupt handler 30, and reads out the log information from the ASICs 10. The analysis log file 32 provided on a ROM included in the failure analysis firmware 20, and stores information, which is necessary for the failure analysis, among the log information read out by the main body log process 31. The detailed log file 33 is provided on the ROM included in the failure analysis firmware 20, and stores information, which is unnecessary for the failure analysis, among the log information read out by the main body log process 31. The main body log analysis process 34 refers to the analysis information stored in the RAS-DB file 11 to analyze the failure in the log information stored in the analysis log file 32.

The main body log analysis process 34 comprises a buffer 40 with a prescribed capacity that stores the log information, which is a result of the failure analysis, and a work memory 41 prepared for the work of the failure analysis.

An RAS-DB definition file 50 and an RAS-DB generator 51 are prepared for the analysis information stored in the RAS-DB file 11. When the analysis definition created by the designer of the ASICs 10 are stored in the RAS-DB definition file 50, the RAS-DB generator 51 compiles the analysis definition to store the analysis definition in the RAS-DB file 11, thereby storing the analysis definition in the RAS-DB file 11.

In the failure analysis firmware 20 configured in such a way, when the interrupt handler 30 receives an interrupt of the occurrence of failure from the ASICs 10, the main body log process 31 receives an interrupt reception notification from the interrupt handler 30, and reads out the log information from the ASICs 10.

Subsequently, the main body log process 31 stores information, which is necessary for the failure analysis, among the log information read out from the ASICs 10 to the analysis log file 32, and stores information, which is unnecessary for the failure analysis, in the detailed log file 33. Then, the main body log process 31 instructs the main body log analysis process 34 to analyze the failure.

Receiving the instruction, the main body log analysis process 34 refers to the analysis information stored in the RAS-DB file 11 to analyze the failure of the log information stored in the analysis log file 32, and reports the analysis result to a destination.

The analysis information stored in the RAS-DB file 11 will be described.

FIG. 3 illustrates a data structure of the RAS-DB file 11.

As shown in FIG. 3, the RAS-DB file 11 includes a declaration unit 60 that declares a file name and the like, and a definition unit 61 that defines specific contents of the analysis information. The definition unit 61 further includes a data definition block 62 that defines the main body of the analysis information, and a common definition block 63 that defines common values used for the items of the data definition block 62.

The values defined in the common definition block 63 are used as default values when the items of the data definition block 62 are omitted. As the common definition block 63 is thus prepared, the designer of the ASICs 10 who creates the analysis information is allowed to omit the description of the information commonly used in the created analysis information.

FIG. 4 illustrates an example of information defined in the common definition block 63.

The common definition block 63 shown in FIG. 4 indicates that type and version number of the ASIC 10 (referred as ASIC), model type of the information processing apparatus mounted with the ASIC 10 (referred as MODEL), number of the system board mounted with the ASIC 10 (referred as BORAD), mounted place on the system board of the ASIC 10 (referred as PLACE), function mode that indicates which hardware function is valid (referred as FUNCTION TYPE), IR code of an ASIC scan loop (referred as IR: indicating the type of the log), direction of an interface between the ASICs (referred as DIRECTION), QUIET code (referred as QUIET), level of an error event (referred as LEVEL), number of a conversion rule (referred as CONVERT), and failure mark indicating a conversion component (referred as MARK) can be defined.

FIG. 5 illustrates an example of the analysis information defined in the data definition block 62.

The data definition block 62 employs a feature of defining the analysis information used for the failure analysis of the ASIC 10 by defining values of the items such as ASIC type, ASIC version number, model type, function mode, mounted board (bd), mounted place (pl), IR code (ir), scan address (adrs), RC/RT display (rcrt), priority (pr), entry disabling condition (dis), entry enabling condition (enb), event level (lvl), message number (msg), action type (action), conversion rule number (conv), and failure mark (mark).

In the example of the data definition block 62 shown in FIG. 5, the ASIC version number (ver), the model type of the information processing apparatus mounted with the ASIC 10 (mdl), and the function mode indicating which hardware function is valid (func) are defined in the common definition block 63, and therefore, it is assumed that the definition is omitted.

As a specific example, the seventh analysis information shown in FIG. 5 is explained as follow. The seventh analysis information is an analysis information that is applied when the model type of the ASIC 10 is "SC", the model type of the information processing apparatus mounted with the ASIC 10 is "DC2", the number of the system board with the ASIC 10 is "0001", and the mounted place on the system board of the ASIC 10 is "F". And, the seventh analysis information is an analysis information that is applied when a failure flag is set at the address bit position "0373" in the log collected from the ASIC 10 according to the IR number "59".

The seventh analysis information indicates that the analysis information will be subjected to failure analysis since the bit of the log is an RC (Region Code) bit. The seventh analysis information indicates that the priority of the log is "10". And, the analysis information is invalid when a bit "/XC/RC_COPY_LOCK_CE" is set, and the analysis information is valid when a bit "/XC/RC_RETRY_LOCK_CE" is set. When the analysis information is valid, a message with the message number of "2A" is reported to the destination in an event "alarm", an action "SC_FTL1_INTF" is performed, and the conversion component used at that point is "/CMU#0".

The analysis information used in the embodiment of the present invention employs a feature that describes conditions denoting that when certain other log information indicates an occurrence of failure, the analysis information in relation to the log information is invalid, and when certain other log information indicates an occurrence of failure, the analysis information in relation to the log information is valid. The conditions are related with the system board numbers of the boards mounted with the ASICs 10 and the mounted places on the boards and in relation to the log information to be collected from the ASICs 10. The analysis information used in the embodiment of the present invention also employs a configuration that defines information to be processed when the log information is generated, and information of the priority of the log information.

The analysis information also includes the log information to be collected from the ASICs 10 mounted on other system boards, so that is described that, when certain other log information indicates the occurrence of failure, the analysis information is invalid, and, when certain other log information indicates the occurrence of failure, the analysis information is valid.

According to the description thus described, the analysis processing unit 12 analyzes the failure occurred in the ASICs 10 using the analysis information stored in the RAS-DB file 11 according to the description format. Then, the analysis processing unit 12 can naturally and simultaneously realize the failure analysis of the entire system.

The fact that this can be realized will be described using a specific example of a system board CMU#0 shown in FIG. 6.

Figure 6:
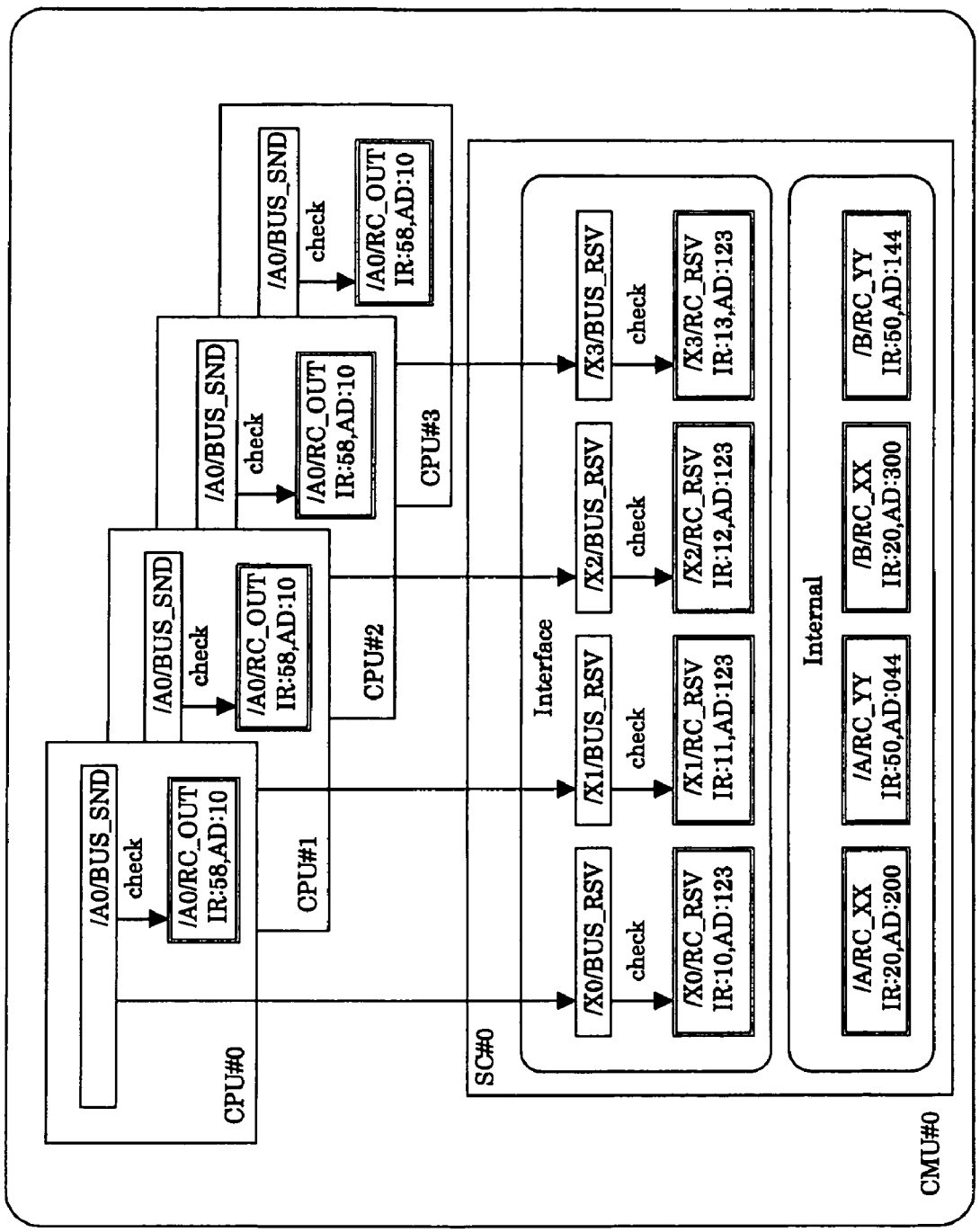
FIG. 6 depicts an example of a system board mounted with ASICs.

It is assumed that the system board CMU#0 shown in FIG. 6 is mounted with five ASICs 10, or an ASIC 10 called CPU#0, an ASIC 10 called CPU#1, an ASIC 10 called CPU#2, an ASIC 10 called CPU#3, and SC#0.

In each of the CPU#0, 1, 2, and 3 a transmission port of a bus called "/A0/BUS_SND" is provided, and, when a failure occurs in the transmission port, a checker that checks the transmission port writes a flag into a flag area indicated by signal name "/A0/RC_OUT", IR number "58", and address bit position "10".

The SC#0 includes a reception port of a bus called "/X0/BUS_RSV" according to the transmission port of a bus included in the CPU#0, and, when a failure occurs in the reception port, a checker that checks the reception port writes a flag into a flag area indicated by signal name "/X0/RC_RSV", IR number "10", and address bit position "123".

The SC#0 includes a reception port of a bus called "/X1/BUS_RSV" according to a transmission port of a bus included in the CPU#1, and, when a failure occurs in the reception port, a checker that checks the reception port writes a flag into a flag area indicated by signal name "/X1/RC_RSV", IR number "11", and address bit position "123".

The SC#0 includes a reception port of a bus called "/X2/BUS_RSV" according to a transmission port of a bus included in the CPU#2, and when a failure occurs in the reception port, the checker that checks the reception port writes in a flag in a flag area indicated by signal name "X2/RC_RSV", IR number "12", and address bit position "123".

The SC#0 includes a reception port of a bus called "/X3/BUS_RSV" according to a transmission port of a bus included in the CPU#3, and, when a failure occurs in the reception port, a checker that checks the reception port writes a flag into a flag area indicated by signal name "/X3/RC_RSV", IR number "13", and address bit position "123".

It is assumed that the SC#0 further includes four flag areas for writing in the flags indicating occurrences of internal failures, or a flag area indicated by signal name "/A/RC_XX", IR number "20", and address bit position "200"; a flag area indicated by signal name "/A/RC_YY", IR number "50", and address bit position "044"; a flag area indicated by signal name "/B/RC_XX", IR number "20", and address bit position "300"; and a flag area indicated by signal name "/B/RC_YY", IR number "50", and address bit position "144".

In this case, analysis information of the CPU#0, 1, 2, and 3 shown in FIG. 7 is stored in the RAS-DB file 11. In FIG. 7, analysis information for DC model and analysis information for FF model are defined, and the only difference between the two is the displayed message.

Meanwhile, analysis information of the SC#0 shown in FIG. 8 is stored in the RAS-DB file 11.

In the analysis information of the SC#0 shown in FIG. 8, an entry disabling condition defines that, when a failure occurs in the transmission ports of the CPU#0, 1, 2, and 3, a failure occurring in the SC#0 which is a reception port is invalid.

According to the definition, when a failure occurs in the transmission ports of the CPU#0, 1, 2, and 3, a failure also occurs in the SC#0, which is a reception port. However, the failure is ignored because the failure has occurred incidentally, not essentially. Only an essential failure occurred in the transmission port can be analyzed.

In the above example indicates that the entry disabling condition is defined in same system boards. However, the entry disabling condition and the entry enabling condition are not limited to be defined in same system boards, but may be defined between different system boards.

As a result, according to the embodiment of the present invention, the failure analysis of the entire system, which is necessary in the conventional failure analysis method based on every system boards, can be omitted.

A creation method of the analysis information having a data structure shown in FIGS. 3 to 5 will be described according to FIG. 9.

As described in FIG. 2, as for the analysis information to be stored in the RAS-DB file 11, when the designer of the ASICs 10 creates the analysis definition to be stored in the RAS-DB definition file 50, the RAS-DB generator 51 compiles and stores the analysis definition in the RAS-DB file 11.

In the creating processing of the analysis information, the number of the system boards and the mounted places of the ASICs 10 mounted on the system boards are changed depending on the model of the information processing apparatus mounted with the ASICs 10. As a result, values of the items such as entry disabling (dis), entry enabling condition (enb), and failure mark (mark) described in the analysis information are changed.

However, a vast amount of loads are imposed on the designer of the ASICs 10, when the creation of different analysis information is requested for each model of the information processing apparatus according to the changes.

Therefore, in the embodiment of the present invention, a method is used in which the designer of the ASICs 10 creates a conversion rule for re-reading the values of the items such as entry disabling (dis), entry enabling condition (enb), and failure mark (mark) according to the model of the information processing apparatus. In addition, the designer creates the analysis information in a general form, not based on the model of the information processing apparatus, thereby realizing the creation of the analysis information according to the model of the information processing apparatus using the conversion rule.

Figure 9:
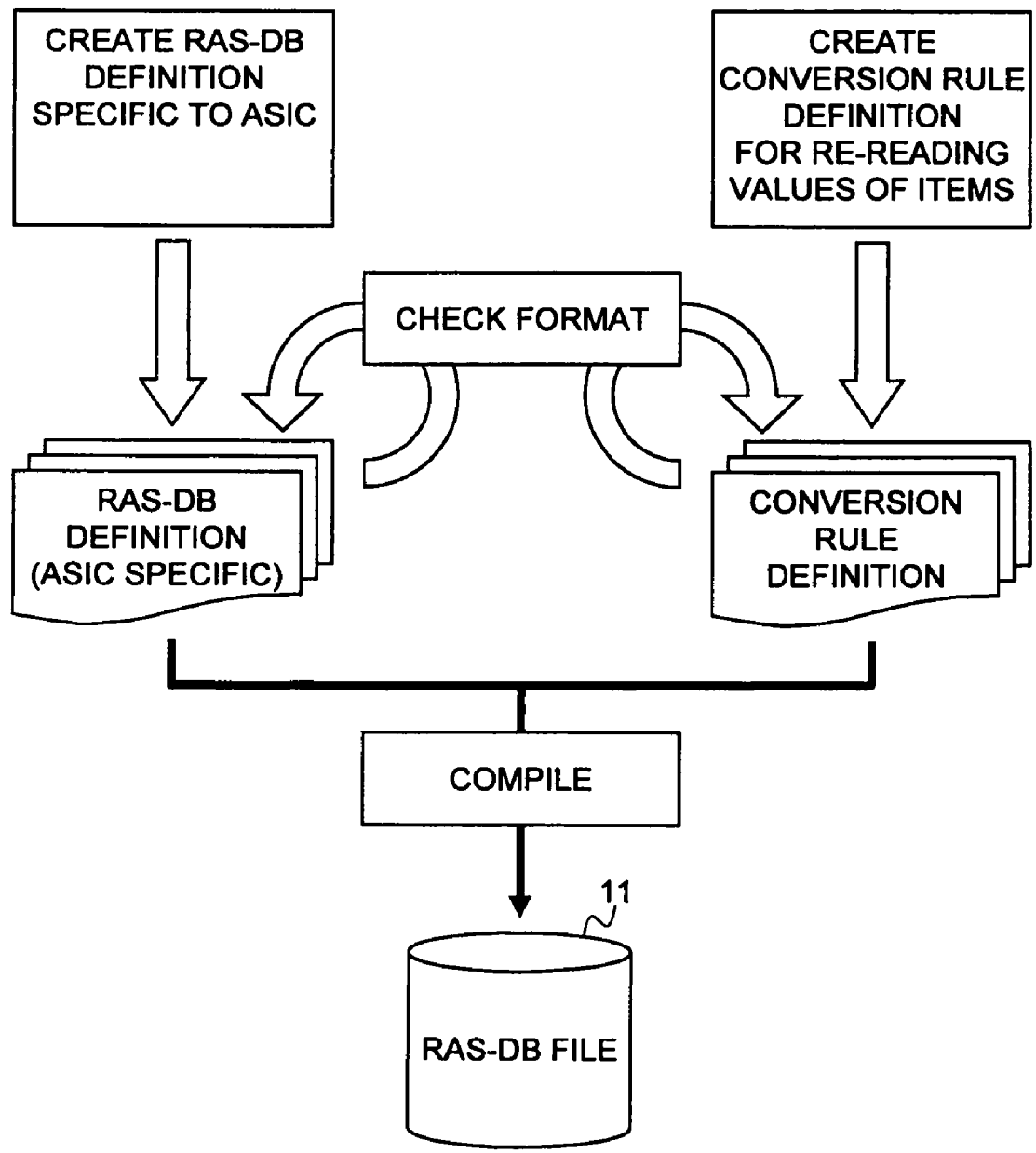
FIG. 9 is an explanatory view of a creation method of the analysis information.

In the embodiment of the present invention, as shown in FIG. 9, the designer of the ASICs 10 creates an RAS-DB definition (RAS-DB definition in a general form, not based on the model of the information processing apparatus) unique to the ASICs 10, and the format of the RAS-DB definition is checked to create the RAS-DB definition unique to the ASICs 10.

The designer of the ASICs 10 (or the designer of the system) then creates the conversion rule definition for re-reading the values of the items such as entry disabling (dis), entry enabling condition (enb), and failure mark (mark) according to the model of the information processing apparatus, and the format of the conversion rule definition is checked to create the conversion rule definition for re-reading according to the model of the information processing apparatus.

The created RAS-DB definition and the created conversion rule definition are combined and compiled to create analysis information suitable for the model of the information processing apparatus to be analyzed, and the analysis information is stored in the RAS-DB file 11.

According to the embodiment of the present invention with this configuration, the designer of the ASICs 10 does not have to create different analysis information for each model of the information processing apparatus.

Figure 10:
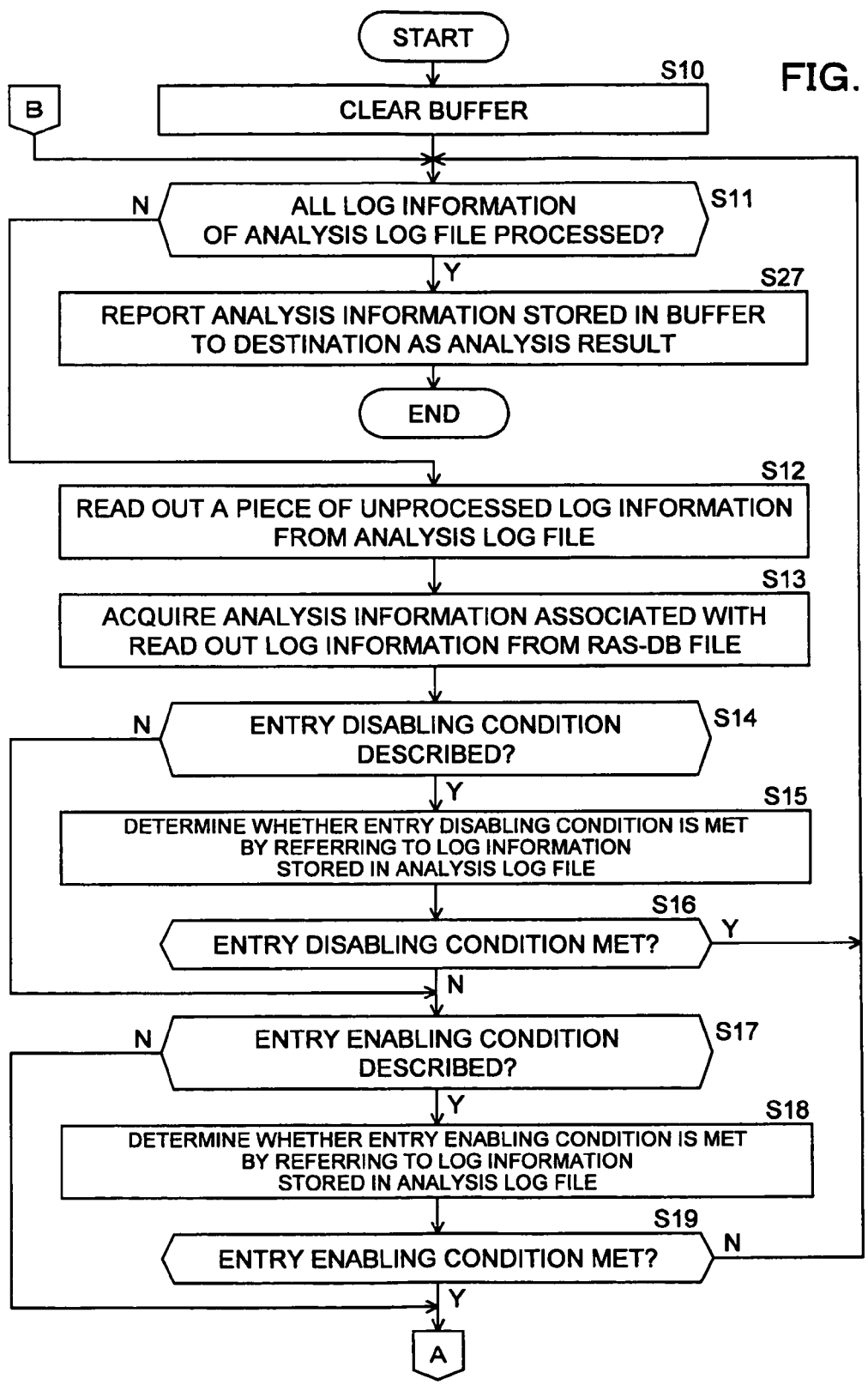
FIG. 10 is a process flow for executing a main body log analysis process.
Figure 11:
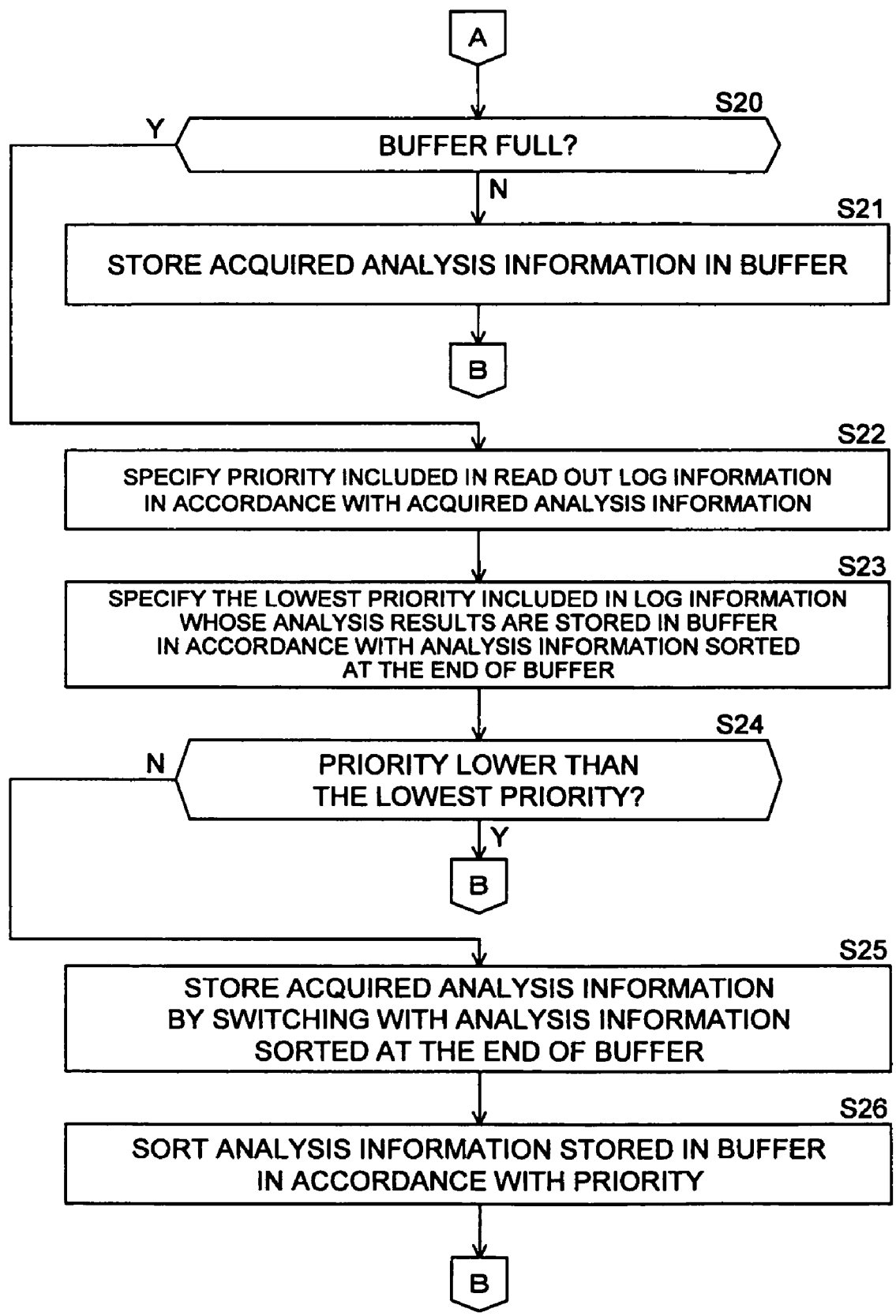
FIG. 11 is a process flow for executing the main body log analysis process.

The process executed by the main body log analysis process 34 shown in FIG. 2 will be described in detail with reference to a process flow of FIG. 10 and FIG. 11.

When an analysis instruction of the log information (log information indicating the occurrence of failure) stored in the analysis log file 32 is issued from the main body log process 31, the main body log analysis process 34 first clears the buffer 40 in the step S10.

In the step S11, the main body log analysis process 34 determines whether or not all log information stored in the analysis log file 32 is processed.

When determining that not all log information stored in the analysis log file 32 is processed according to the determination process of the step S11, the main body log analysis process 34 proceeds to the step S12 and reads out a piece of unprocessed log information from the analysis log file 32.

In the step S13, the main body log analysis process 34 acquires analysis information, from the RAS-DB file 11, which is related with the log information read out in the step S12.

In the step S14, the main body log analysis process 34 determines whether or not an entry disabling condition is described in the analysis information acquired in the step S13.

When determining that the entry disabling condition is described in the analysis information acquired in the step S13 according to the determination process of the step S14, the main body log analysis process 34 proceeds to the step S15 and refers to the log information stored in the analysis log file 32 to determine whether the entry disabling condition is met.

In the step S16, when determining that the entry disabling condition described in the analysis information acquired in the step S13 is met according to the determination process of the step S15, the main body log analysis process 34 returns to the process of the step S11 to process the next log information.

Specifically, when the entry disabling condition described in the analysis information acquired in the step S13 is met, the analysis information is invalid, so that the log information read out in the step S12 does not have to be analyzed. Therefore, the main body log analysis process 34 returns to the process of the step S11 to process the next log information.

On the other hand, when determining that the entry disabling condition is not described in the analysis information acquired in the step S13 according to the determination process of the step S14, or when determining that the entry disabling condition described in the analysis information acquired in the step S13 is not met according to the determination process of the step S16, the main body log analysis process 34 proceeds to the step S17 and determines whether or not an entry enabling condition is described in the analysis information acquired in the step S13.

When determining that the entry enabling condition is described in the analysis information acquired in the step S13 according to the determination process of the step S17, the main body log analysis process 34 proceeds to the step S18 and refers to the log information stored in the analysis log file 32 to determine whether the entry enabling condition is met.

In the step S19, when determining that the entry enabling condition described in the analysis information acquired in the step S13 is not met according to the determination process of the step S18, the main body log analysis process 34 returns to the process of the step S11 to process the next log information.

Specifically, when the entry enabling condition described in the analysis information acquired in the step S13 is not met, the analysis information is invalid, so that the log information read out in the step S12 does not have to be analyzed. Therefore, the main body log analysis process 34 returns to the process of the step S11 to process the next log information.

On the other hand, when determining that the entry enabling condition is not described in the analysis information acquired in the step S13 according to the determination process of the step S17, or when determining that the entry enabling condition described in the analysis information acquired in the step S13 is met according to the determination process of the step S19, the main body log analysis process 34 proceeds to the step S20 and determines whether or not the buffer 40 is full.

In other words, when determining that the analysis information acquired in the step S13 is ultimately valid, the main body log analysis process 34 proceeds to the step 20 and determines whether or not the buffer 40 is full.

When determining that the buffer 40 is not full according to the determination process of the step S20, the main body log analysis process 34 proceeds to the step S21, stores the analysis information acquired in the step S13 in the buffer 40, and analyzes the log information read out in the step S12. Then, the main body log analysis process 34 returns to the process of the step S11 to process the next log information.

Specifically, the analysis information relating with the log information read out in the step S12 describes that, when the log information is generated, a certain failure has occurred, so that a certain process must be performed. Therefore, the main body log analysis process 34 stores this in the buffer 40 as an analysis result and returns to the process of the step S11 to process the next log information.

Meanwhile, when determining that the buffer 40 is full according to the determination process of the step S20, the main body log analysis process 34 proceeds to the step S22 and specifies the priority included in the log information read out in the step S12 according to the priority information described in the analysis information acquired in the step S13.

In the step S23, the main body log analysis process 34 specifies the lowest priority included in the log information, whose analysis results are stored in the buffer 40, according to the analysis information sorted at the end of the buffer 40 (the one with the lowest priority is sorted).

In the step S24, the main body log analysis process 34 determines whether or not the priority specified in the step S22 is lower than the priority specified in the step S23.

When determining that the priority specified in the step S22 is lower than the priority specified in the step S23 according to the determination process of the step S24, the main body log analysis process 34 returns to the step S11 to process the next log information.

Specifically, when determining that the priority specified in the step S22 is lower than the priority specified in the step S23, the main body log analysis process 34 determines that the log information read out in the step S12 is less important than the log information whose analysis results are stored in the buffer 40 and immediately returns to the process of the step S11 without performing any processing.

On the other hand, when determining that the priority specified in the step S22 is higher than the priority specified in the step S23 according to the determination process of the step S24, the main body log analysis process 34 proceeds to the step S25 and stores the analysis information acquired in the step S13 in the buffer 40 by switching with the analysis information sorted at the end of the buffer 40 (the one with the lowest priority is sorted), thereby analyzing the log information read out in the step S12.

Specifically, when determining that the priority specified in the step S22 is higher than the priority specified in the step S23, the main body log analysis process 34 determines that the log information read out in the step S12 is more important than the log information with the lowest priority, whose analysis results are stored in the buffer 40, and stores the analysis result in the buffer 40 by switching with the log information.

In the step S26, the main body log analysis process 34 sorts the analysis information stored in the buffer 40 according to the priority, and then returns to the process of the step S11 to process the next log information.

In the repetition of the steps S11 to S26, when the main body log analysis process 34 determines that all log information stored in the analysis log file 32 is processed in the step S11, the main body log analysis process 34 proceeds to the step S27, reports the analysis information stored in the buffer 40 to the destination as the analysis result of the failure analysis, and ends the process.

Figure 12:
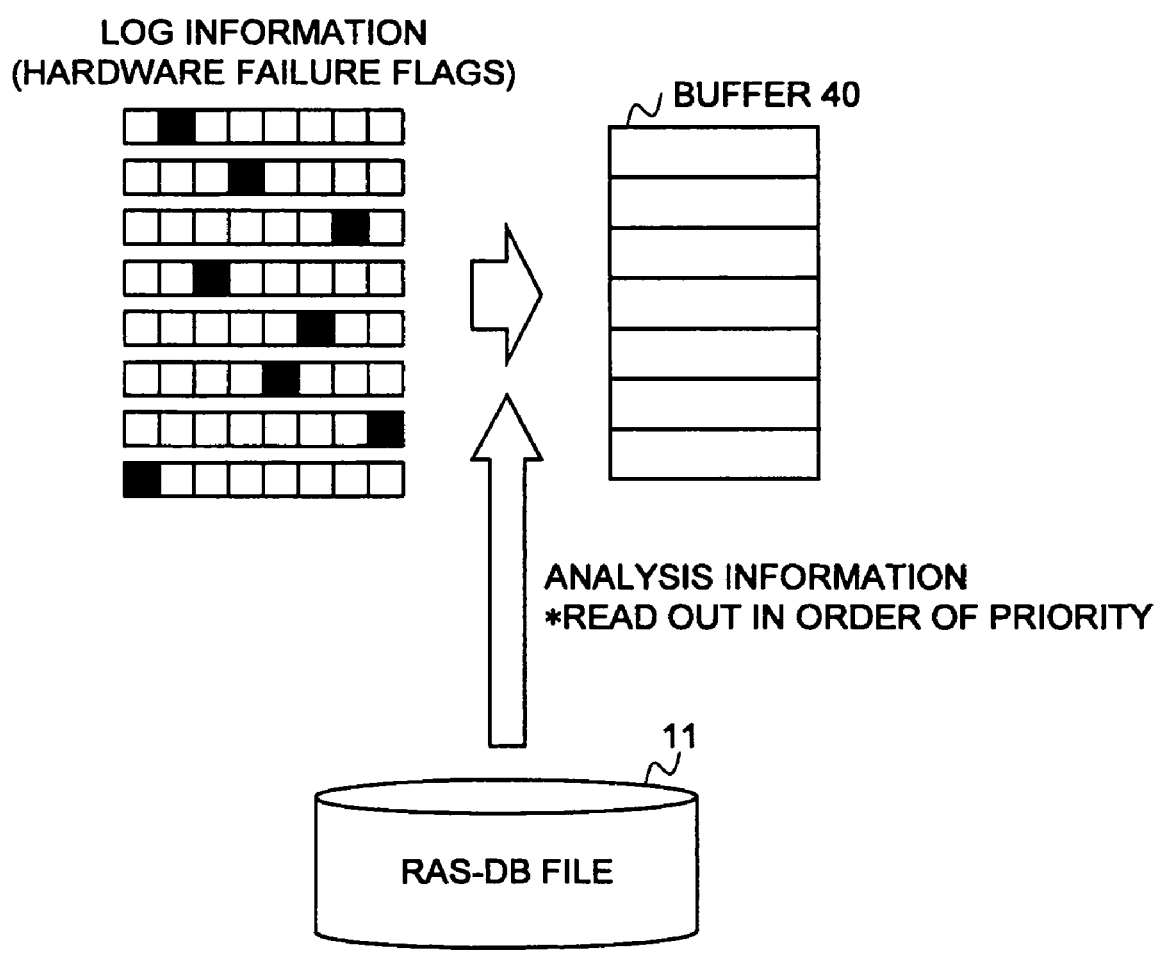
FIG. 12 is an explanatory view of a process for executing the main body log analysis process.

In this way, when the analysis instruction of the log information (log information indicating the occurrence of failure) stored in the analysis log file 32 is issued from the main body log process 31, the main body log analysis process 34 processes to acquire the analysis information relating with the log information according to the order of the priority from the RAS-DB file 11, and stores the analysis information in the buffer 40, thereby analyze the failure, as shown in FIG. 12.

According to the embodiment of the present invention which performs the processing above described, a thorough analysis of the log information having higher priority can be ensured.

Upon execution of the process described above, in order to reduce the capacity of the work memory 41, the main body log analysis process 34 does not read out the analysis information stored in the RAS-DB file 11 to the work memory 41 at the startup of the system as shown in FIG. 13. Instead, the main body log analysis process 34 writes only the index table used for the index of the analysis information in the work memory 41.

When a failure occurs, the main body log analysis process 34 acquires information indicating what kind of ASIC 10 is mounted on the information processing apparatus implementing the process, and specifies the analysis information applied to the ASIC 10 indicated by the acquired information according to the index table read out to the work memory 41. Then, the main body log analysis process 34 reads out the analysis information from the RAS-DB file 11, and writes the analysis information in the work memory 41.

According to the embodiment of the present invention having the features above described, the capacity of the work memory 41 required for the failure analysis can be significantly reduced as compared to the conventional failure analysis method in which even the analysis information not to be used is permanently stored in the work memory 41.

The embodiment of the present invention does not analyze failures on every system boards as in the conventional art, but instead, analyzes failures based on the hardware circuits such as the ASICs 10 mounted on the system boards.

Thus, in the embodiment of the present invention, the impossible range of the failure analysis due to a lack of log information is based on the hardware circuits.

Figure 14:
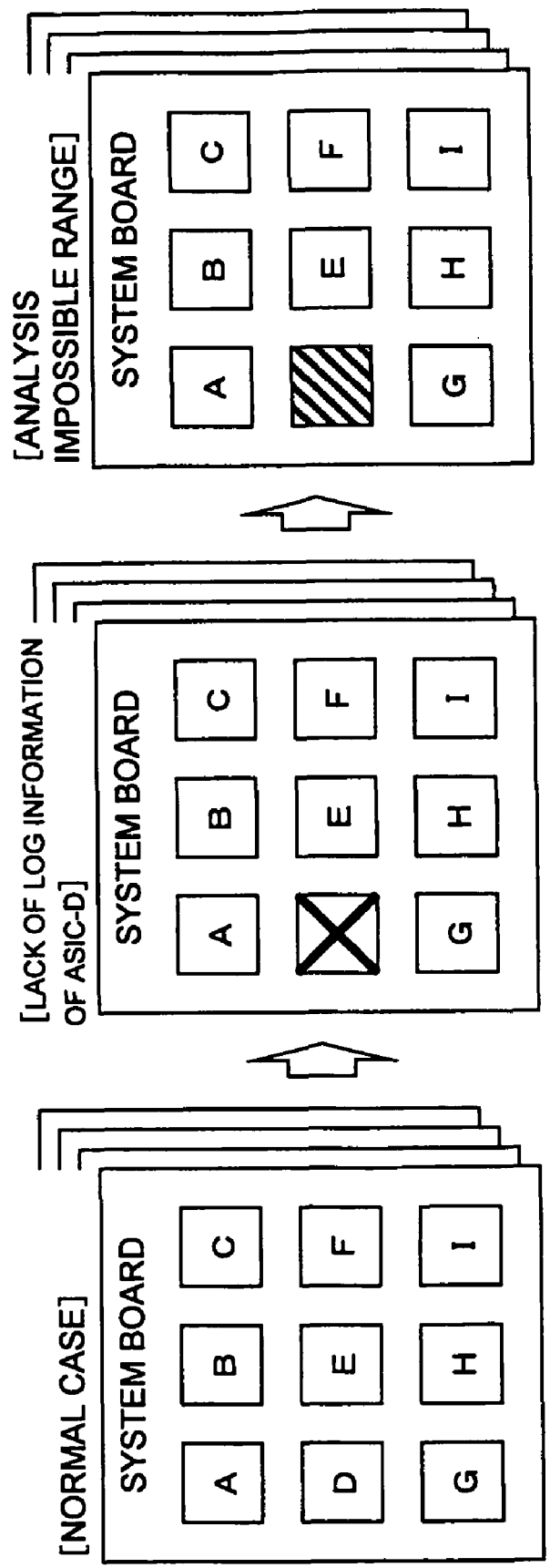
FIG. 14 is an explanatory view of a failure unanalyzable range according to the present invention.
Figure 15:
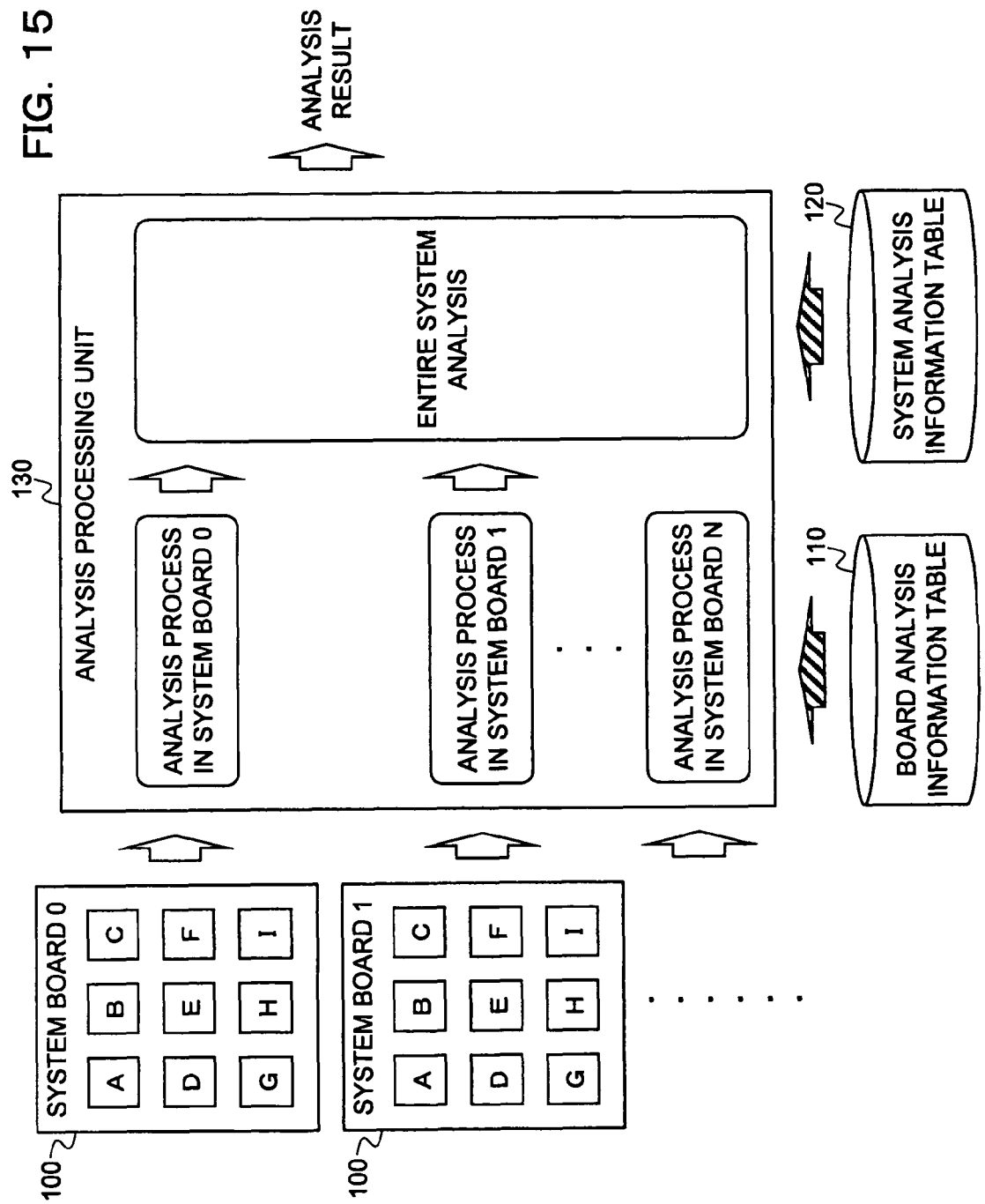
FIG. 15 is an explanatory view of a conventional art.
Figure 16:
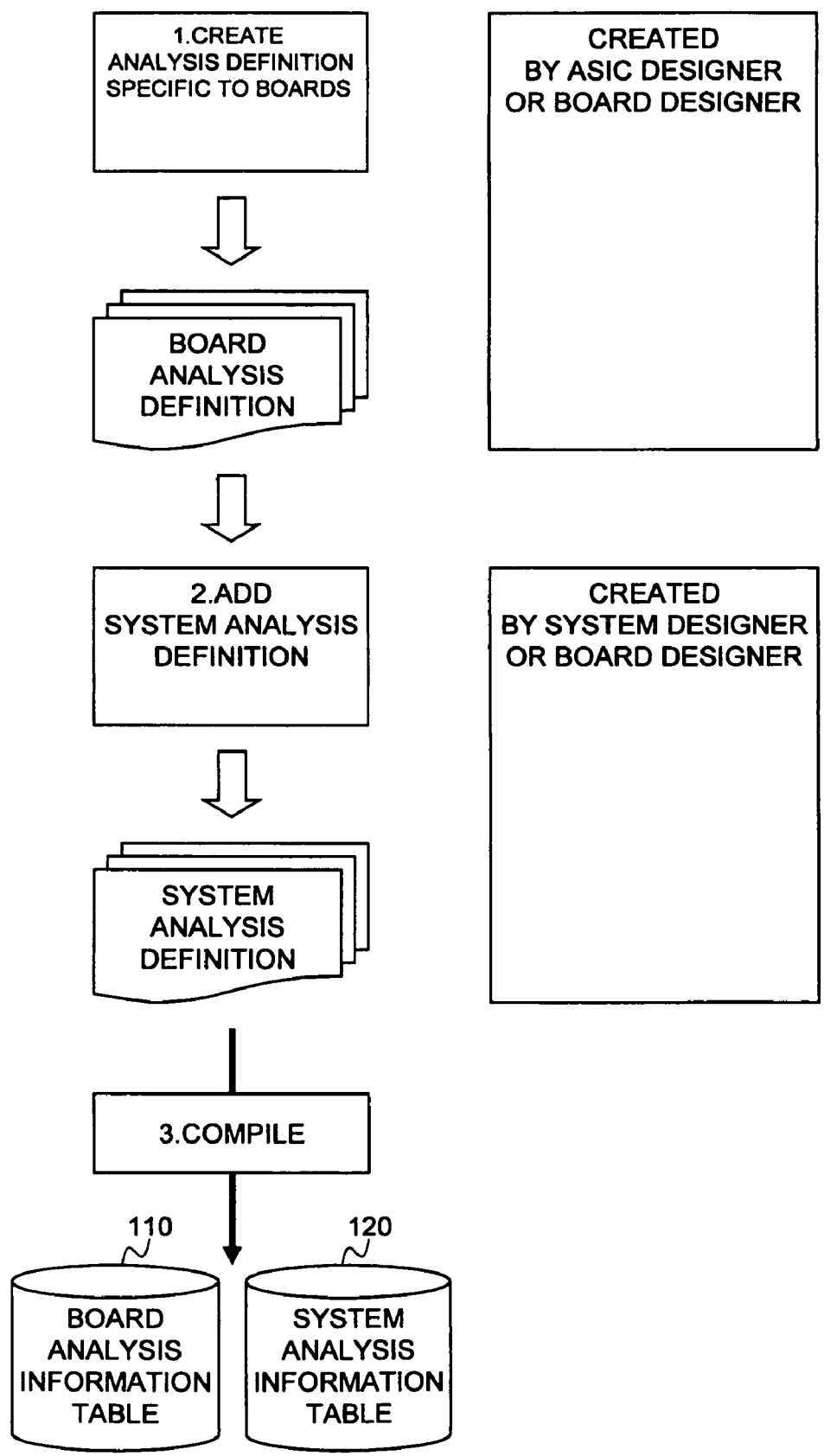
FIG. 16 is an explanatory view of the conventional art.

Therefore, in the embodiment of the present invention, as shown in FIG. 14 for example, in a situation such as when a hardware failure flag cannot be collected from one ASIC 10 (for example, ASIC-D shown in FIG. 14) mounted on the system board 100, only that ASIC 10 becomes unanalyzable. Thus, the entire system board will not be unanalyzable as in the conventional art.

According to the present embodiment, the impossible range of the failure analysis can be significantly reduced as compared to the conventional art.

According to the present embodiment, for realizing a function of analyzing failures occurred in the logic circuits such as LSIs mounted on the information processing apparatus, a reduction in memory resources, faster processing, and a reduction in the labor for the development are realized, a thorough analysis of critical failures is realized, and a reduction in the unanalyzable range is realized.

What is claimed is:

1. A failure analysis apparatus that is implemented on an information processing apparatus having a plurality of boards each of which are mounted with a plurality of logic circuits and that analyzes a kind of a failure occurred in a logic circuit, the failure analysis apparatus comprising:

storage means for storing analysis information for each logic circuit of the plurality of logic circuits mounted on the plurality of boards, each analysis information being for log information to be collected from a logic circuit and related with a board number of a board on which the logic circuit is mounted and a mounted place of the logic circuit on the board, and each analysis information further describing information to be processed when the log information is collected, information of a first condition for which the log information is to be valid, and information of a second condition for which the log information is to be invalid;

collecting means for collecting log information from the plurality of logic circuits using a single logic circuit as a unit of collecting whereby the information of the first and second conditions for determining validity of the log information are correlatable to the board number of the board on which the single logic circuit is mounted and the mounted place of the single logic circuit on the board, and collecting, when a failure occurs in a logic circuit, log information indicating an occurrence of the failure from the failed logic circuit;

analysis means for analyzing a kind of the failure occurred in the failed logic circuit based on the log information collected by the collection means and stored analysis information related with a board number of a board on which the failed logic circuit is mounted and a mounted place of the failed logic circuit on the board; and a buffer having a prescribed memory capacity, wherein the analysis means stores, when the log information is to be valid based on the analyzing the information of the first condition described in the analysis information, the log information in the buffer so the log information to be valid of the failed logic circuit is obtainable from the buffer, and wherein the storage means further stores common parts of a plurality of the analysis information for the plurality of logic circuits mounted on the plurality of boards as one common information that is common to the plurality of the analysis information.

2. The failure analysis apparatus according to claim 1, wherein the analysis information further describes information of the priority of the log information.

3. The failure analysis apparatus according to claim 1, wherein the storage means describes information of a condition denoting which log information that indicates an occurrence of a failure is to be valid as the information of the first condition.

4. The failure analysis apparatus according to claim 1, wherein the storage means describes information of a condition denoting which log information that indicates an occurrence of a failure is to be invalid as the information of the second condition.

5. The failure analysis apparatus according to claims 1, wherein the analysis means analyzes what kind of failure has occurred in the logic circuit by extracting valid log information from the log information collected by the collection means based on condition information described in the analysis information.

6. The failure analysis apparatus according to claim 5, wherein the analysis means extracts log information having a higher priority from the extracted log information based on the priority information described in the analysis information.

7. The failure analysis apparatus according to claim 6, wherein, the analysis means extracts the log information having the higher priority, after extracting the valid log information based on the condition information described in the analysis information from the log information collected by the collection means, by, when the priority of the extracted log information is higher than the priority of the log information stored in a buffer having a prescribed memory capacity, storing the extracted log information by switching with log information having the lowest priority stored in the buffer, and when the priority of the extracted log information is lower than the priority of the log information stored in the buffer, not storing the extracted log information in the buffer.

8. The failure analysis apparatus according to claim 1, further comprising:

first deployment means for storing index information in the storage means when the failure analysis apparatus is started up, the index information being used for an index of the analysis information applied to logic circuits that may be mounted on the information processing apparatus to be analyzed; and second deployment means for specifying, when a failure occurs in the logic circuits, the analysis information necessary for the analysis by the analysis means according to the index information and the information of the logic circuits mounted on the information processing apparatus to be analyzed, and storing the specified analysis information in the storage means.

9. The failure analysis apparatus according to claims 1, wherein the storage means stores common parts of a plurality of the analysis information for the plurality of logic circuits mounted on the plurality of boards as one common information that is common to the plurality of the analysis information.

10. The failure analysis apparatus according to claim 1, wherein the analysis means determines whether the first condition is met and determines whether the second condition is met when the first condition is not met, and the storage means stores the log information collected from the failed logic circuit when the log information is to be valid based on the determination on the second condition.

11. The failure analysis apparatus according to claims 1, further comprising:

generation means for generating the analysis information to be stored in the storage means by using a RASDB (Reliability Availability Serviceability Database) definition and a conversion rule definition, the RASDB definition defined for each logic circuit and being definition information of the analysis information that is required to analyze the failure, the conversion rule definition used for conversion that converts information to the analysis information that is described in specific description format.

* * * * *

UNITED STATES PATENT AND TRADEMARK OFFICE
CERTIFICATE OF CORRECTION

PATENT NO. : 8,166,337 B2
APPLICATION NO. : 12/230241
DATED : April 24, 2012
INVENTOR(S) : Masato Nakagawa It is certified that error appears in the above-identified patent and that said Letters Patent is hereby corrected as shown below:

Column 17, Line 45, In Claim 5, delete "claims" and insert -- claim --, therefor.

Column 18, Line 29, In Claim 9, delete "claims" and insert -- claim --, therefor.

Column 18, Line 42, In Claim 11, delete "claims" and insert -- claim --, therefor.

Signed and Sealed this
Twenty-eighth Day of August, 2012

David J. Kappos
*Director of the United States Patent and Trademark Office*